(12) United States Patent
Messinger et al.

(10) Patent No.: US 7,849,408 B1
(45) Date of Patent: *Dec. 7, 2010

(54) NETWORK TRAFFIC VISUALIZATION

(75) Inventors: Fred Messinger, Groton, MA (US);
George Swallow, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 1011 days.

This patent is subject to a terminal disclaimer.

(21) Appl. No.: 10/758,664

(22) Filed: Jan. 15, 2004

Related U.S. Application Data (63) Continuation of application No. 09/291,381, filed on Apr. 14, 1999, now Pat. No. 6,687,750.

(51) Int. Cl.
*G06F 15/177* (2006.01)

(52) U.S. Cl. .................. 715/736; 715/733; 715/734; 715/737

(58) Field of Classification Search ......... 715/733–739, 715/772
See application file for complete search history.

(56) References Cited

U.S. PATENT DOCUMENTS

| | | | |
|---|---|---|---|
| 4,471,348 A | 9/1984 | London et al. | |
| 5,276,789 A | 1/1994 | Besaw et al. | |
| 5,295,244 A | 3/1994 | Dev et al. | |
| 5,349,662 A | 9/1994 | Johnson et al. | |
| 5,471,616 A | 11/1995 | Johnson et al. | |
| 5,559,955 A | 9/1996 | Dev et al. | |
| 5,570,326 A | 10/1996 | Trystram | |
| 5,659,768 A | 8/1997 | Forbes et al. | |
| 5,720,022 A * | 2/1998 | Reichert et al. | 345/660 |
| 5,751,965 A | 5/1998 | Mayo et al. | |
| 5,768,552 A * | 6/1998 | Jacoby | 345/441 |
| 5,793,974 A | 8/1998 | Messinger | |
| 5,819,028 A * | 10/1998 | Manghirmalani et al. | 714/57 |
| 5,821,937 A * | 10/1998 | Tonelli et al. | 715/853 |
| 5,850,386 A | 12/1998 | Anderson et al. | |
| 5,850,388 A | 12/1998 | Anderson et al. | |
| 5,878,420 A | 3/1999 | Salle | |
| 6,054,987 A | 4/2000 | Richardson | |
| 6,065,138 A | 5/2000 | Gould et al. | |
| 6,070,190 A * | 5/2000 | Reps et al. | 709/224 |
| 6,104,392 A | 8/2000 | Shaw et al. | |
| 6,112,015 A * | 8/2000 | Planas et al. | 709/223 |
| 6,122,639 A | 9/2000 | Babu et al. | |
| 6,144,987 A | 11/2000 | Niemi | |
| 6,219,708 B1 | 4/2001 | Martenson | |
| 6,252,947 B1 | 6/2001 | Diamond et al. | |
| 6,269,447 B1 | 7/2001 | Maloney et al. | |

(Continued)

*Primary Examiner*—Simon Ke
(74) *Attorney, Agent, or Firm*—Cesari and McKenna, LLP (57) ABSTRACT

A system containing a visualization application which enables the user or other user to obtain information about various types of transactions involving the respective activities of the components. The user selects filtering criteria that identify various types of transactions performed on each network component from the visualization application and the visualization application uses these criteria in compiling the appropriate records from the network information files. The visualization application then forms the data that represent the records that meet each selected criterion and stores the data in a local file. Thereafter, the user may view the network activity through the visualization application which displays a map of the network and overlays the map with graphical moving images that represent the data for each selected criterion. The graphical images change with time to reflect changes in the underlying data.

37 Claims, 4 Drawing Sheets

U.S. PATENT DOCUMENTS

| | | |
|---|---|---|
| 6,271,845 B1 | 8/2001 | Richardson |
| 6,279,037 B1 | 8/2001 | Tams et al. |
| 6,281,790 B1 | 8/2001 | Kimmel et al. |
| 6,289,368 B1 | 9/2001 | Dentler et al. |
| 6,295,527 B1 | 9/2001 | McCormack et al. |
| 6,304,262 B1 | 10/2001 | Maloney et al. |
| 6,308,148 B1 | 10/2001 | Bruins et al. |
| 6,327,620 B1 | 12/2001 | Tams et al. |
| 6,453,345 B2 * | 9/2002 | Trcka et al. ............ 709/224 |
| 6,578,077 B1 * | 6/2003 | Rakoshitz et al. ........ 709/224 |
| 2002/0013837 A1 * | 1/2002 | Battat et al. ............ 709/223 |

* cited by examiner

NETWORK TRAFFIC VISUALIZATION

This application for United States patent is filed as a continuation of U.S. application patent Ser. No. 09/291,381 filed on Apr. 14, 1999, entitled Network Traffic Visualization, now issued as U.S. Pat. No. 6,687,750 on Feb. 3, 2004.

FIELD OF THE INVENTION

This invention relates to network management applications that assemble network information, and specifically to a visualization application that displays network traffic information assembled by the network management applications.

BACKGROUND OF THE INVENTION

Distributed computer networks, to which this invention applies, are systems comprising a number of components such as printers, computers, routers and the like, that are interconnected to enable communication among the components and sharing of data and resources. For example, a distributed computer network may include a combination of separate local area networks (LAN) that are connected in a wide area network (WAN) to form a single distributed network structure. The LANs are interconnected to communicate with each other by routers. Each LAN may include servers and clients that are connected by physical media such as cables and network cards in order to share resources such as files or applications. A server may be a computer or process that provides shared network resources to network users and a client is usually a computer that accesses the shared network resources provided by the servers. Shared resources in a network may include printers, other peripherals and software applications.

Network activity information relating to messages transmitted over the network is commonly stored in designated network information files on one or more of the network's computers. As activity information is received from the various network components, it is appended to these files. Records in the files are time stamped to indicate when they were received. The information files thus maintain a record of all activities over the network over some period of time.

In order to view the network activity for a particular computer or group of computers, facilities are commonly provided to retrieve selected data for examination by the user. Such data may include, for example, the amount of traffic into or out of a particular resource in the system; a record of particular kinds of traffic; the identity of traffic originators, etc. Typically, the data is presented in tabular form, and the amount of data can be overwhelming. Thus, it is often difficult to assimilate the data presented. In order to facilitate assimilation of the data, the amount of data may be selectively reduced in volume, but this correspondingly diminishes the information that can be gleaned from it. Most often, such a reduction involves selecting a subset of the data based on the source and/or destination of the data. While such views are interesting in and of themselves, they fail to present a comprehensive, gestalt view of the network

SUMMARY OF THE INVENTION

We have created a visualization application which enables a user such as a system is administrator to rapidly obtain and assimilate substantial amounts of information about various types of transactions involving the respective activities of the components. In particular, in accordance with the present invention, information concerning various aspects of network traffic is monitored and stored for subsequent retrieval and use. For example, the information may be collected by one or more routers through which the data passes as it transits the network, and stored in a separate file from which it is subsequently retrieved for display.

The user may select for display specific subsets of the collected information, as well as specific attributes of these subsets. The criteria for specifying the data may include, among other elements, the identification of particular components whose activity is to be monitored; the starting and ending times of the interval over which the information is to be monitored for subsequent display; the frequency within the interval at which the information is to be monitored and the duration of the monitoring at each instance (e.g., for a twenty-four hour interval, a monitoring period of one minute at every ten minutes); and other pertinent characteristics. The network visualization application begins extracting data from the network information files at the starting time and stops extracting data at the ending time. During each intermediate time interval, the visualization application compiles the information in the information file that meets the filtering criteria set forth by the system administrator, and stores the selected information for display at stated times or at the request of the administrator.

The visualization application displays a map of the network and dynamically overlays the map with graphical images that represent the selected information designated by the system administrator or other user. The information is presented in a dynamic, graphic (as opposed to numeric) manner that the user can quickly assimilate. For example, traffic between selected computers may be represented by lines whose width, color, density or other characteristic changes in accordance with the volume of traffic over time. By taking "snapshots" of this traffic at discrete intervals over a larger interval, one effectively forms "frames" that depict the traffic at various times and that, when is played back one after the other in rapid succession, create a "movie clip" of the selected traffic flow parameters. This provides an environment in which the system administrator or other user can accurately and visually analyze the composition of network activity and thereby reduce human errors that occur during interpretation of static data tables that heretofore have been relied upon for presentation of network information.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 4-A depicts a subset of FIG. 1 and a graphical image of the network activities between selected components on LAN 101 at time $t_1$;

FIG. 4-B depicts a subset of FIG. 1 and a graphical image of the network activities between selected components on LAN 101 at time $t_2$;

FIG. 4-C depicts a subset of FIG. 1 and a graphical image of the network activities between selected components on LAN 101 at time $t_3$; and FIG. 4-D depicts a subset of FIG. 1 and a graphical image of the network activities between selected components on LAN 101 at time $t_4$.

DETAILED DESCRIPTION OF AN ILLUSTRATIVE EMBODIMENT

Figure 1:
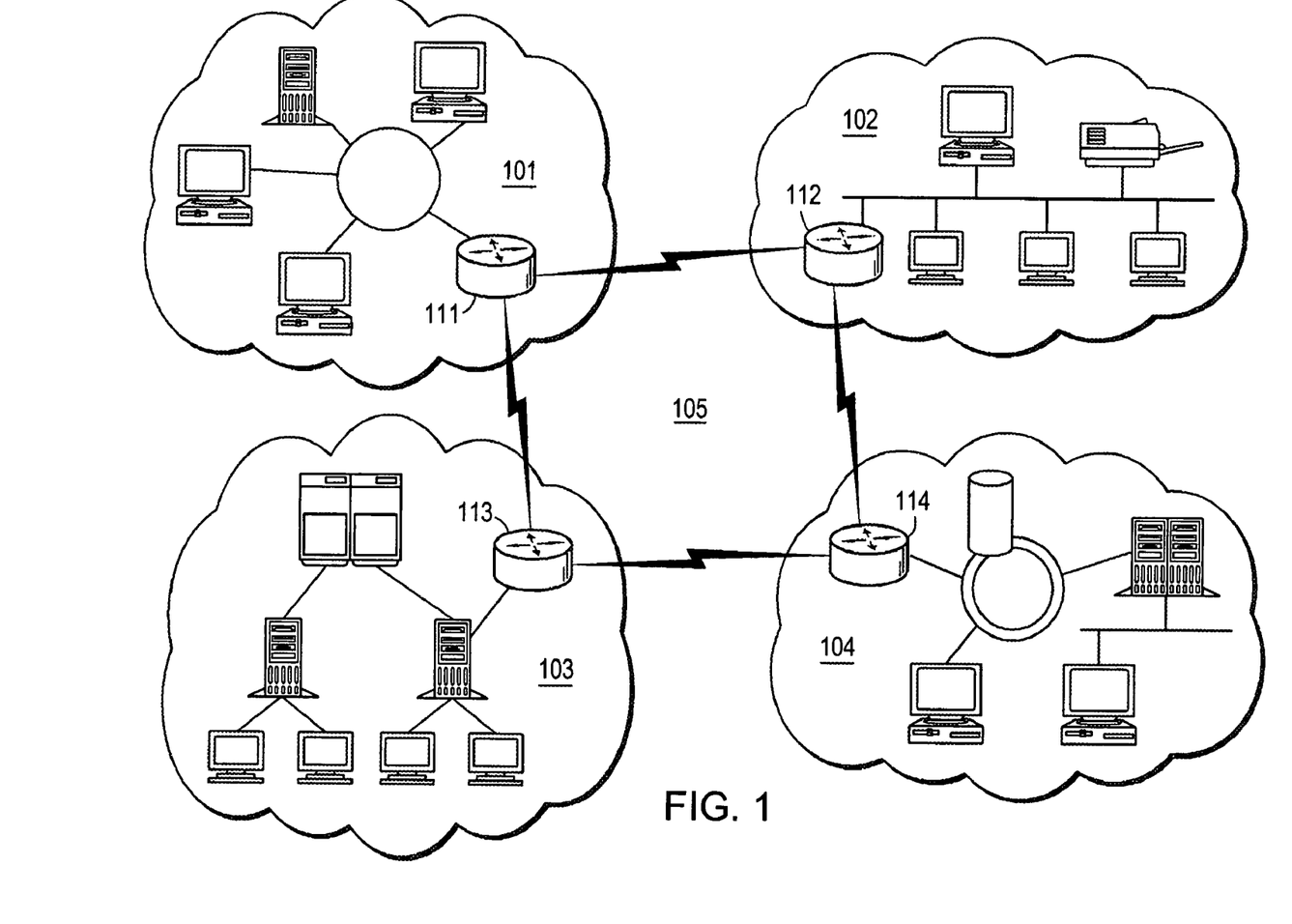
FIG. 1 is a diagram of a network management system incorporating the invention.

FIG. 1 is a schematic diagram of a distributed network management system that is configured to share resources and data in accordance with the present invention. The illustrated system is a combination of four separate local area networks (LAN) 101-104 that are interconnected into a wide area network (WAN) 105 to form a single distributed network structure. Each LAN 101-104 may include servers and clients that are connected by physical media such as cables and network cards in order to share resources such as files or applications. A server may be a computer or process that provides shared network resources to network users, and a client may be a computer or process that accesses the shared network resources provided by the servers. Shared resources in a network may include printers and other peripherals, as well as software applications. The LANs 101-104 are interconnected to communicate with each other by routers 111-114. The routers exchange protocol-specific information between separate networks and determine the best path for sending data.

In order to effectively manage a distributed network system, the system administrator or other user must monitor network activity. Timely and accurate information about the states of each network component and the activities performed on each component is required for the system administrator to perform the necessary network management functions. Therefore, the states of these network components are consistently monitored by a reporting structure which records the component's states and each network activity performed on those components.

Figure 2:
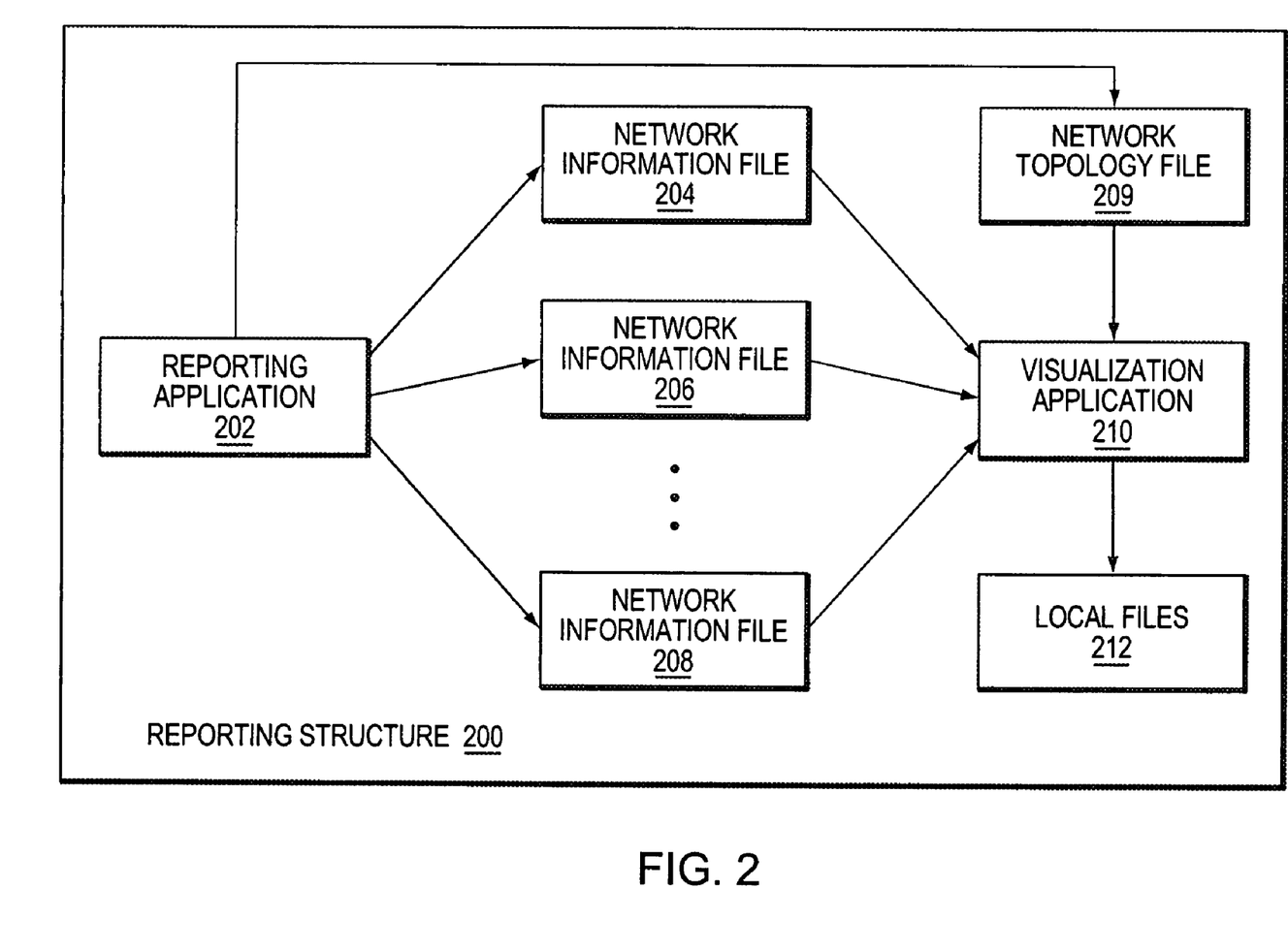
FIG. 2 is a schematic diagram of the network reporting structure and how they interact with each other.

The illustrative reporting structure 200 shown in FIG. 2 may reside in any location on the network. It includes a reporting application 202, three network information files 204-208 stored in one or more locations on the network, a network topology file, 209, and a visualization application 210 for extracting information from the network information files 204-208 and graphically displaying the information to the system administrator. The reporting application 202 constantly monitors the state of each network component and appends the results to the appropriate network information file 204-208. It also receives a record of each network activity and appends those to the information files 204-208. The records in the network information files 204-208 are time stamped to indicate when each record was generated. While the recording of network activity may be performed by a single reporting application 202, this task can also be performed without a reporting application. Each of the network components can append its state and activities directly to the appropriate network information files 204-208. The network files 204-208 are typically monitored and backed up by the system administrator and information in those files 204-208 may be deleted at the system administrator's discretion. The network topology file 209 records and stores the topology of the network at the times the network information files are generated.

In accordance with the present invention, after the network starts up, the user manually executes the visualization application 210 and uses the graphical user interface in the application to create filtering expressions for extracting the desired information from the network information files 204-208. The visualization application enables the user to obtain information about the overall network activities; to obtain information about activities between two or more network components; and to obtain information about each transaction performed on each network component. The user selects the appropriate filtering criteria from the graphical user interface associated with the visualization application 210. Based on the selected filtering criteria, the visualization application 210 selects the relevant data with the correct time stamp from the network information files 204-208, executes the filtering expression on selected data, calculates parameters that are associated with the selected data, and stores the calculated parameters in a local file 212. The topology of the network corresponding to this data is associated with it either directly in local file 212 or through links to the network topology file 209. Subsequently, when the user views the selected data through the visualization application 210, the visualization application 210 exhibits a map of the network and graphically displays the generated parameters through representational moving images that change with time to thereby represent changes in the underlying parameters as a function of time. Examples of representational moving images used by the visualization application 210 to display the generated parameters may include black and white or colored arrows, bar charts, graphs and other representational indicia whose length, width, density, color, or other visual or sensory characteristics vary in accordance with the desired parameters to be representationally displayed.

An example of a parameter of interest might be the number of log-in attempts made from a particular computer to others, or made to one or more computers in the network. These attempts may appropriately be represented by arrows directed from the computer of interest to the other computers in the network, or simply directed to the other computers, as the case may be. The arrows are shown in a dynamic fashion, e.g., as short directed segments traversing a portion of the screen during the display interval from or to one or more computers to indicate the "probing" nature of the log-in. The log in rate, i.e., the number of attempted log-ins during a given time interval, may be represented by the rate at which the arrow traverses the screen, or by the width or the arrow, or by the color, intensity or other changeable characteristic of the arrow or other representational element. The user may advantageously select the desired representational characteristics for the specified parameters, or they may be determined by default in the visualization application.

The visualization application 210 preferably maintains the selected files in the local files until the user decides to delete them. This enables the user to review the results from the reporting structure until the results are no longer needed.

Figure 3:
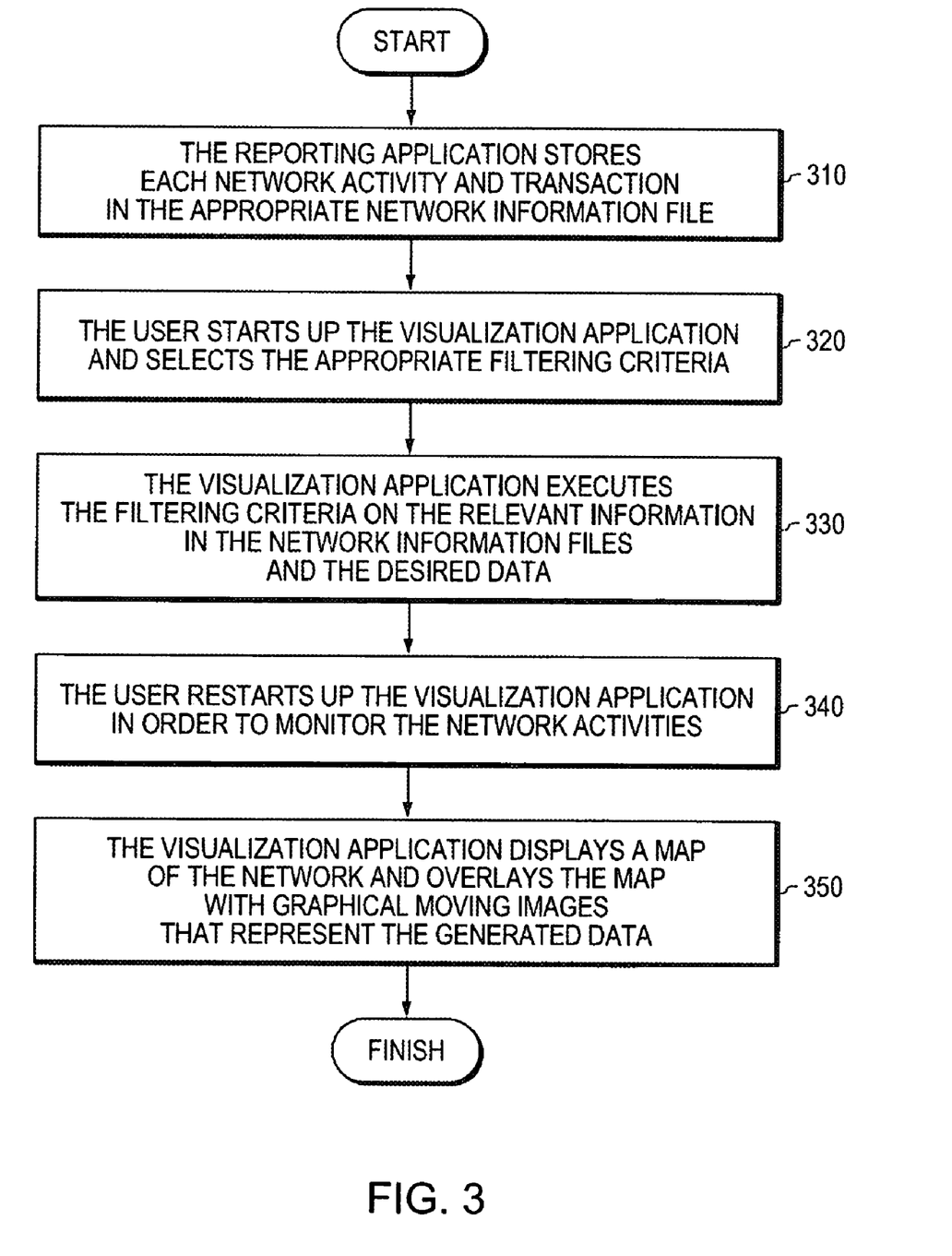
FIG. 3 is an example of the steps performed by the network reporting structure in order to display the composition of network traffic to the user.

FIG. 3 is an example illustrating the steps performed by the reporting structure 202 in order to generate a graphical display for the system operator. For example, if a "hacker", i.e., an unauthorized user, tries to obtain access to one or more computers on the network, the data in the reporting structure 200 accurately reports such information to the system operator in the following steps. In Step 310, the reporting application stores each log-in transaction performed by the hacker in the appropriate information files 204-208. Thus, for example, if the hacker uses the same user name with an excessive number of different passwords while trying to gain access to a single computer, the reporting structure will record each log-in transaction with each of the different passwords. As another example, if the hacker uses the same user name/ password while trying to gain access to a number of different computers in the network, a record of each log-in transacts on each computer will be stored in the appropriate information files 204-208. During the network monitoring, the system operator or other user of the visualization application will be able to trace the changes in the destination computer by the hacker.

In Step 320, the user starts up the visualization application 210 and uses the graphical user interface in the visualization application to create filtering expressions for extracting the desired information from the network information files 204-208. The user selects the appropriate filtering criteria from the graphical user interface associated with the visualization application 210. In Step 330, the visualization application 210 selects the relevant data from the network information files 204-208; executes the filtering expression on selected data and stores the filtered data in a local file. In Step 340, the user restarts the visualization application 210 in order to monitor the network activities. In Step 350, the visualization application 210 displays a map of the network and overlays the map with a graphical display of dynamically changing images that represent the selected data over the selected time period.

Figures 4A, 4B:
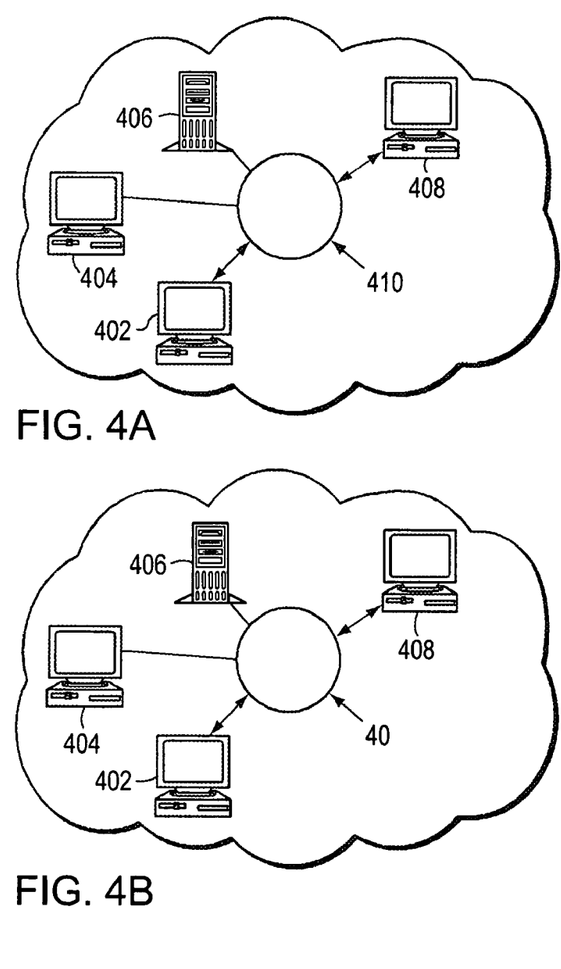
Figure 4C:
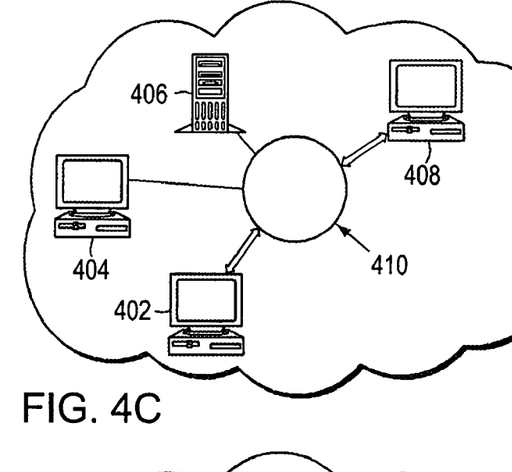
Figure 4D:
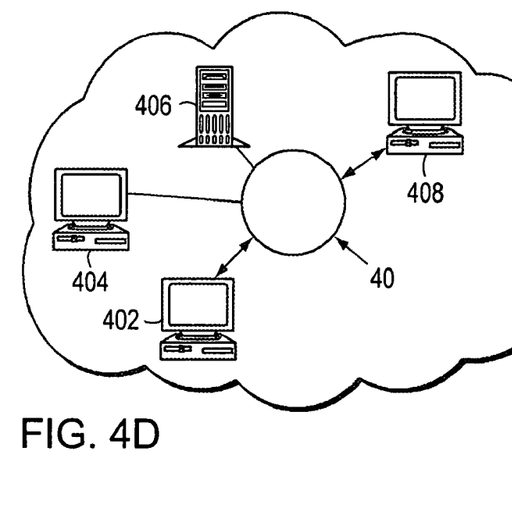

FIGS. 4-A to 4-D further illustrate how information is displayed to the system operator through the visualization application 210. FIGS. 4-A to 4-D depict a subset of FIG. 1, each figure displaying LAN 101 and representational images of the network activities between selected components on LAN 101. According to the invention, the user may choose to view the activities on or between any network components. For instance, the user may choose to observe the network activities between components 402 and 408 passing through switch 410 FIGS. 4-A to 4-D and thus portray network activities between components 402 and 408 for a selected period of time.

In particular, after selecting the appropriate information from the information files to and generating the data corresponding with the selected information, the visualization application 210 displays a map of the network. In this case, the visualization application displays a subset of the network that depicts LAN 101. The visualization application 210 then dynamically overlays the map with graphical images that symbolize the generated data. In FIGS. 4-A to 4-D, double sided arrows are used as the graphical images. At time is $t_1$, the visualization application 210 displays medium width, double sided arrows between components 402 to 408, as shown in FIG. 4-A. This portrays a moderate amount network traffic between these network components during the time subinterval corresponding to $t_1$. At time $t_2$, FIG. 4-B, the arrows between components 402 and 408 have a smaller width to graphically illustrate less network traffic. At time $t_3$, FIG. 4-C, the arrows between these components are considerably thicker and graphically denote more network traffic than at times $t_1$ and $t_2$; finally, at time $t_4$, FIG. 4-D, the arrows between computers 402 and 408 are again narrower, thus depicting a moderate amount of network activities between components 402 and 408. FIGS. 4-A to 4-D therefore give the user a visual, dynamic display of the network activities that is instantly assimilable and that does not require the user to analyze massive amounts of data in static tables.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for graphically presenting characteristics of data traffic on a distributed computer network, comprising:
monitoring traffic on said network;
storing records relating to said traffic in one or more network information files;
selecting a characteristic of said traffic for display;
obtaining a plurality of values of said characteristic of said traffic from said one or more network information files for a selected plurality of time intervals within a larger time interval; and
displaying a map of a network topology of said network;
presenting said characteristic by playing a rapid succession of graphical images of said map of said network topology, each graphical image representing said network as nodes connected by lines overlaid on said map, said nodes each representing components in said network, said lines representing traffic flow between said components, each graphical image graphically representing the value of said characteristic at a particular selected time interval of said plurality of time intervals within the larger time interval with a property of at least one line of said lines that connect nodes, wherein said property includes a density of said at least one line,
wherein a change in said density of said at least one line that connects nodes in successive graphical images of said map of the network topology indicates a change in the value of said characteristic of said traffic between said components.

2. The method as in claim 1 wherein said density of said at least one line is a width of said at least one line.

3. The method as in claim 1, further comprising:
using a color of said at least one line to further define said property, a change in said color further indicating a change in the value of said characteristic of said traffic.

4. The method as in claim 1, further comprising:
using an arrow drawn on said at least one line to further define said property, a change in said arrow further indicating a change in the value of said characteristic of said traffic.

5. The method as in claim 1, further comprising:
receiving a selection of a filtering expression in a graphical user interface;
selecting records from said network information files; and
executing said filtering expression on the selected records.

6. The method as in claim 5, further comprising:
calculating parameters that are associated with the records selected from said network information files and storing the parameters in a local file.

7. The method as in claim 1, further comprising:
using a filtering program to select records in said network information files that meet selected filtering criteria.

8. The method as in claim 7, further comprising:
compiling the selected records from said network information files, each compiled record meeting at least one selected filtering criterion.

9. The method as in claim 8, further comprising:
calculating data that represent the compiled records, and storing the data in a file.

10. The method of claim 8, further comprising:
including a time interval criterion which indicates how often to compile and package information from the network information files.

11. The method of claim 1, further comprising:
defining the larger time interval with a starting time and an ending time specified within a filtering criteria.

12. A data visualization apparatus for graphically presenting characteristics of data traffic on a distributed computer network, comprising:
means for monitoring traffic on said network;
means for storing records relating to said traffic;

means for selecting characteristics of said traffic for display;

means for obtaining a plurality of values of said characteristics of said traffic from said means for storing for a selected plurality of time intervals within a larger time interval; and means for displaying a map of a network topology of said network;

means for presenting said characteristics by playing a rapid succession of graphical images of said map of said network topology, each graphical image representing said network as nodes connected by lines overlaid on said map, said nodes each representing components in said network, said lines representing traffic flow between said components, each graphical image graphically representing the value of said characteristics at a particular time interval of said plurality of time intervals within the larger time interval with a property of at least one line of said lines that connects nodes, wherein said property includes a density of said at least one line, wherein a change in said density of said at least one line that connects nodes in successive graphical images of said map of said network topology indicates a change in the value of said characteristics of said traffic between said components.

13. The apparatus as in claim 12, wherein said density is a width of said at least one line.

14. The apparatus as in claim 12, further comprising:
means for a using a color of said at least one line to further define said property, a change in said color further indicating a change in the value of said characteristics of said traffic.

15. The apparatus as in claim 12, further comprising:
means for using an arrow drawn on said at least one line to further define said property, a change in said arrow further indicating a change in the value of said characteristics of said traffic.

16. The apparatus as in claim 12, further comprising:
means for receiving a selection of a filtering expression;
means for selecting records from network information files; and
means for executing said filtering expression on the selected records.

17. The apparatus as in claim 16, further comprising:
means for calculating parameters that are associated with the records selected from said network information files and storing the parameters in a local file.

18. The apparatus as in claim 12, further comprising:
means for using a filtering program to select records in network information files that meet selected filtering criteria.

19. The apparatus as in claim 18, further comprising:
means for compiling the selected records from said network information files, each compiled record meeting at least one selected filtering criterion.

20. The apparatus as in claim 19, further comprising:
means for calculating data that represent the compiled records, and storing the data in a file.

21. The apparatus as in claim 19, further comprising:
means for including a time interval criterion which indicates how often to compile and package information from the network information files.

22. The apparatus as in claim 12, further comprising:
means for defining the larger time interval with a starting time and an ending time specified within a filtering criteria.

23. A data visualization apparatus for graphically presenting characteristics of data traffic on a distributed computer network, comprising:
a computer to monitor traffic on said network and store storing records relating to said traffic;
a graphical user interface to select a characteristic of said traffic for display;
a reporting system executing on said computer to obtain a plurality of values of said characteristic of said traffic from said stored records for a selected plurality of time intervals within a larger time interval; and
a visualization system executing on said computer to display a map of a network topology of said network and present said characteristic by playing a rapid succession of graphical images of said map of said network topology, each graphical image representing said network as nodes connected by lines overlaid on said map, said nodes each representing components in said network, said lines representing traffic flow between said components, each graphical image graphically representing the value of said characteristic at a particular selected time interval of said plurality of time intervals within the larger time interval with a property of at least one line of said lines that connect nodes, wherein said property includes a density of said at least one line, wherein a change in said density of said at least one line that connects nodes in successive graphical images of said map of the network topology indicates a change in the value of said characteristic of said traffic between said components.

24. The apparatus as in claim 23 wherein the density of said at least one line is a width of said at least one line.

25. The apparatus as in claim 23, further comprising:
instructions to execute in said computer to use a color of said at least one line to further define said property, a change in said color further indicating a change in the value of said characteristic of said traffic.

26. The apparatus as in claim 23, further comprising:
instructions to execute in said computer to use an arrow drawn on said at least one line to further define said property, a change in said arrow further indicating a change in the value of said characteristic of said traffic.

27. The apparatus as in claim 23, further comprising:
instructions to execute in said computer to receive a selection of a filtering expression in a graphical user interface;
instructions to execute in said computer to select records from network information files; and
instructions to execute in said computer to execute said filtering expression on the selected records.

28. The apparatus as in claim 27, further comprising:
instructions to execute in said computer to calculate parameters that are associated with the records selected from said network information files and storing the parameters in a local file.

29. The apparatus as in claim 23, further comprising:
instructions to execute in said computer to use a filtering program to select records in network information files that meet selected filtering criteria.

30. The apparatus as in claim 29, further comprising:
instructions to execute in said computer to compile the selected records from network information files each compiled record meeting at least one selected filtering criterion.

31. The apparatus as in claim 30, further comprising:
instructions to execute in said computer to calculate data that represent the compiled records, and storing the data in a file.

32. The apparatus as in claim 30, further comprising:
instructions to execute in said computer to include a time interval criterion which indicates how often to compile and package information from the network information files.

33. The apparatus as in claim 23, further comprising:
instructions to execute in said computer to define the larger time interval with a starting time and an ending time specified within a filtering criteria.

34. A method comprising:
monitoring data traffic in a distributed computer network;
storing records relating to the data traffic in one or more network information files;
selecting a characteristic of the data traffic for display;
extracting data from the network information files related to the selected characteristic for a plurality of time intervals within a larger time interval; and
for each time interval within the larger time interval, generating a frame that visually depicts a map of the network topology of the distributed computer network, with nodes of the map representing network components, the nodes interconnected by lines overlaid on the frame that represent traffic flow between the network components, the frame, that visually depicts the map of the network topology, to visually indicate a value of the characteristic of data traffic between two network components with the visual appearance of a line interconnecting the two nodes representing those two network components; and
playing a rapid succession of frames, that visually depict the map of the network topology, to a user to illustrate changes in the characteristic of the data traffic over the larger time interval, wherein changes in a density of a line interconnecting the two nodes in successive frames indicate changes in the value of the characteristic of the data traffic between the two network components.

35. The method of claim 34 wherein the characteristic of the data traffic is a number of attempted long-ins.

36. The method of claim 34 wherein the characteristic of the data traffic is an amount of data traffic.

37. The method of claim 34 wherein the extracting selects data from the network information files using a filtering expression.

\* \* \* \* \*

UNITED STATES PATENT AND TRADEMARK OFFICE
CERTIFICATE OF CORRECTION

| | | |
|---|---|---|
| PATENT NO. | : 7,849,408 B1 | Page 1 of 1 |
| APPLICATION NO. | : 10/758664 | |
| DATED | : December 7, 2010 | |
| INVENTOR(S) | : Fred Messinger | |

It is certified that error appears in the above-identified patent and that said Letters Patent is hereby corrected as shown below:

Col. 1, Line 63, please replace "system is administrator" with --system administrator--

Col. 2, Line 36, please replace "when is played" with --when played--

Col. 4, Line 65, please replace "transacts" with --transaction--

Col. 5, Line 40, please delete "is"

Col. 8, Line 5, please delete "storing"

Signed and Sealed this
Tenth Day of May, 2011

David J. Kappos
*Director of the United States Patent and Trademark Office*